(12) United States Patent
Shiraishi

(10) Patent No.: US 7,881,421 B2
(45) Date of Patent: Feb. 1, 2011

(54) ACCUMULATOR

(75) Inventor: Tadashi Shiraishi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 185 days.

(21) Appl. No.: 11/564,046

(22) Filed: Nov. 28, 2006

(65) Prior Publication Data

US 2008/0121300 A1    May 29, 2008

(51) Int. Cl.
*G21C 9/00* (2006.01)
(52) U.S. Cl. .................. 376/282; 376/219; 376/215
(58) Field of Classification Search .......... 376/282, 376/219, 215
See application file for complete search history.

(56) References Cited

U.S. PATENT DOCUMENTS

| | | | | |
|---|---|---|---|---|
| 1,971,328 A * | 8/1934 | Byrne et al. | ................ | 431/185 |
| 2,610,697 A | 9/1952 | Lovelady et al. | | |
| 2,783,702 A * | 3/1957 | O'Day | ................ | 454/333 |
| 3,080,307 A | 3/1963 | Rinald | | |
| 3,204,772 A | 9/1965 | Ruxton | | |
| 3,864,209 A * | 2/1975 | Tong | ................ | 376/352 |
| 4,166,478 A | 9/1979 | Sugimura et al. | | |
| 4,411,137 A * | 10/1983 | Pearce | ................ | 60/739 |
| 4,506,523 A | 3/1985 | DiCarlo et al. | | |
| 4,666,654 A | 5/1987 | Forsberg | | |
| 4,817,863 A | 4/1989 | Bragg et al. | | |
| 5,309,488 A * | 5/1994 | Matsuoka | ................ | 376/282 |
| 5,414,743 A | 5/1995 | Batheja et al. | | |
| 6,131,463 A * | 10/2000 | Morris | ................ | 73/714 |
| 6,402,820 B1 * | 6/2002 | Tippetts et al. | ................ | 96/157 |

FOREIGN PATENT DOCUMENTS

| | | |
|---|---|---|
| EP | 0 362 596 A1 | 4/1990 |
| JP | 63-19597 A | 1/1988 |
| JP | 4-328494 A | 11/1992 |
| JP | 05-256982 A | 10/1993 |

(Continued)

OTHER PUBLICATIONS

Shiraishi, T. et al., "Characteristics of the Flow-Controlled Accumulator," Nuclear Technology, vol. 108, Nov. 1994, pp. 181-190.*

(Continued)

*Primary Examiner*—Rick Palabrica
(74) *Attorney, Agent, or Firm*—Westerman, Hattori, Daniels & Adrian, LLP

(57) ABSTRACT

An object of the present invention is to provide an accumulator including a flow damper which is capable of performing a control so that a vortex may not be formed in a vortex chamber at the time of a large flow injection without requiring huge labors and fabrication costs. The flow damper is configured of a colliding jet controller (a bevel or a projection) for controlling a colliding jet composed of a jet from a large flow pipe and a jet from a small flow pipe flowing into a vortex chamber at the time of a large flow injection so that the colliding jet may proceed directly to an outlet without forming a vortex in the vortex chamber. The colliding jet controller is provided at a junction of an inner surface of the small flow pipe and an inner surface of the vortex chamber.

3 Claims, 8 Drawing Sheets

FOREIGN PATENT DOCUMENTS

| | | |
|---|---|---|
| JP | 8-285974 A | 11/1996 |
| WO | WO 93/04481 A1 | 3/1993 |

OTHER PUBLICATIONS

I.C. Chu et al., "Performance Evaluation of Passive Safety Injection Flow Controllers for the APR1400 Reactor," Proceedings of ICONE 10-22479 10$^{th}$ International Conference on Nuclear Engineering, pp. 1-7, Apr. 14-18, 2002, Arlington, Virginia.

H.G. Kim et al., "The Design Verification of the Advanced Design Features in APR1400," Proceedings of ICONE 13-50941 13$^{th}$ International Conference on Nuclear Engineering, pp. 1-4, May 16-20, 2005, Beijing, China.

T. Ichimura et al., "Advanced Accumulator for PWR", Denryoku Kyodo Kenkyu, vol. 48 No. 5, May 1997, pp. 35-42.

Taiki Ichimura et al., "Design Verification of the Advanced Accumulator for the APWR in Japan", 8th International Conference on Nuclear Engineering, Apr. 2-6, 2000, pp. 1-9.

International Search Report dated Feb. 19, 2008 issued in Japanese Patent Office PCT/JP2007/072067.

Office Action issued on Jan. 29, 2010 in U.S. Appl. No. 12/382,578.

Office Action issued on May 5, 2010 in U.S. Appl. No. 12/382,578, filed Mar. 19, 2009.

* cited by examiner

Fig. 11A
Fig. 11B
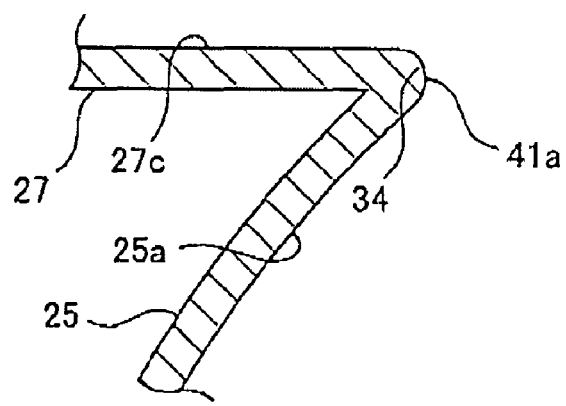
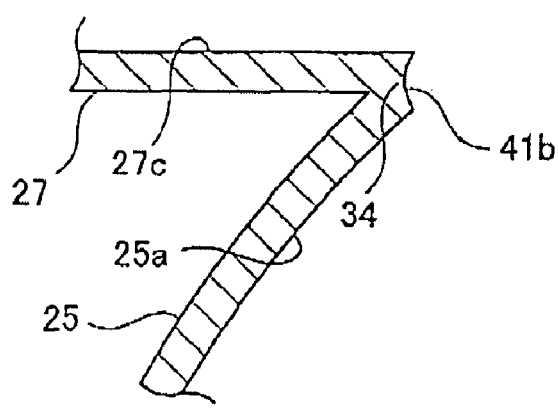

ACCUMULATOR

BACKGROUND OF THE INVENTION

1. Field of the Invention

The present invention relates to an accumulator incorporating a flow damper which is capable of statically switching flow rates from large to small. The present invention is useful when applied to an accumulator of an emergency injection system for a reactor in a pressurized water reactor (PWR) power plant, for example.

2. Description of the Related Art

An emergency core cooling system is installed in the PWR power plant. The emergency core cooling system includes an accumulator and so forth on the assumption that the PWR might cause a loss of primary coolant accident.

Water (coolant) is stored in the accumulator, and the water stored therein is pressurized by a pressurizing gas (nitrogen gas) which is filled in an upper part in the accumulator. Moreover, a flow damper is provided in the accumulator. The flow damper can switch a water injection flow rate in a reactor from a large flow to a small flow statically (without moving any part thereof). The flow damper includes a vortex chamber, a large flow pipe, a small flow pipe, an outlet pipe and the like, and is disposed at the bottom in the accumulator (see FIG. 1). A tip end of the outlet pipe is connected to a low temperature pipeline of a reactor primary coolant loop with a check valve interposed in between. The check valve is used for avoiding a back flow from a rector primary cooling system to the accumulator.

If the pipeline or the like in the reactor primary cooling system of the PWR power plant is broken and the coolant flows out of a crack to the outside (i.e. upon occurrence of a loss of primary coolant accident), the amount of the coolant in a reactor vessel may be reduced, and thereby a reactor core may become exposed. In this situation, however, if a pressure of the primary cooling system drops below a pressure in the accumulator, the water stored in the accumulator is injected from the primary cooling system pipeline into the reactor vessel through the check valve, and thereby refloods the reactor core.

In this case, the reactor vessel is refilled quickly by injecting water at a large flow rate at an initial stage thereof. Then, it is necessary to switch the water injection flow rate from the large flow to a small flow at a later stage when the reactor core is reflooded, because excessively injected water may spill out of the crack. In order to ensure this water injection flow rate switching operation, a reliable flow damper without a moving part is used for the accumulator.

The principles of the water injection flow rate switching by use of such a flow damper will be explained on the basis of FIGS. 10A and 10B (horizontal sectional views).

As shown in FIGS. 10A and 10B, a flow damper 10 has a structure in which a large flow pipe 2 and a small flow pipe 3 are connected to a peripheral portion (a circumferential portion) of a cylindrical vortex chamber 1, while an outlet 4 is formed in the center of the vortex chamber 1. The large flow pipe 2 and the small flow pipe 3 extend in mutually different directions from the outlet 4. Specifically, the small flow pipe 3 extends in the left direction along a tangential direction to the peripheral portion (the circumferential portion) of the vortex chamber 1. Meanwhile, the large flow pipe 2 extends in the right direction while forming a predetermined angle θ with the small flow pipe 3. Moreover, although illustration is omitted, an inlet of the small flow pipe 3 is located at the same level as the vortex chamber 1. Meanwhile, the large flow pipe 2 is connected to a standpipe which extends upward. An inlet of this standpipe is located higher than the vortex chamber 1 and the inlet of the small flow pipe 3. Furthermore, an outlet pipe is connected to the outlet 4 of the vortex chamber 1.

Moreover, since the water level in the accumulator is higher than the inlet of the large flow pipe 2 at the initial stage of water injection, the water in the accumulator flows into the vortex chamber 1 from both of the large flow pipe 2 and the small flow pipe 3 as indicated with arrows A and B in FIG. 10A. As a result, the injected water (a jet) from the large flow pipe 2 collides with the injected water (a jet) from the small flow pipe 3, and angular momenta of the jets are offset. In this way, the water flows directly toward the outlet 4 as indicated with an arrow C in FIG. 10A. Specifically, no vortex is formed in the vortex chamber at this time. Accordingly, a flow resistance is reduced at this time, and thus a large amount of water flows out of the outlet 4 and is injected into the reactor vessel.

By contrast, at the later stage of water injection, the water level in the accumulator drops below the inlet of the standpipe connected to the large flow pipe 2. Accordingly, there is no water flow from the large flow pipe 2 into the vortex chamber 1, and the water flows into the vortex chamber 1 only through the small flow pipe 3 as indicated with an arrow B in FIG. 10B. As a result, the injected water from this small flow pipe 3 proceeds to the outlet 4 while forming a vortex (a swirling flow) as indicated with an arrow D in FIG. 10B. Accordingly, the flow resistance is increased by the centrifugal force at this time, and an outflow (the water injected to the reactor vessel) from the outlet 4 becomes a small flow. This device is called a flow damper because it has the function to damp the flow rate as described above.

As described above, the accumulator currently in development is the advanced accumulator which is capable of switching from a large flow to a small flow statically and securely by including the flow damper 10. Moreover, the flow damper 10 of this advanced accumulator is required to define a proportion between the large flow and the small flow as high as possible in order to achieve a reasonable tank volume. For this reason, it is essential not to form a vortex in the vortex chamber by surely offsetting the angular momenta between the jet from the large flow pipe 2 and the jet from the small flow pipe 3 at the time of the large flow injection. In addition, it is necessary to generate a high flow resistance by forming a strong vortex in the vortex chamber 1 when switching from the large flow to the small flow.

For this reason, in the case of a large flow, it is necessary to control an angle θ defined between the large flow pipe 2 and the small flow pipe 3 (a collision angle of the two jets) and the flows (the flow rates) of the large flow pipe 2 and the small flow pipe 3 so that the jet from the large flow pipe 2 and the jet from the small flow pipe 3 mutually offset the angular momenta. Moreover, in the case of a small flow, a strong vortex is formed in the vortex chamber 1 by connecting the small flow pipe 3 to the peripheral portion (the circumferential portion) of the vortex chamber 1 along the tangential direction.

However, in an attempt not to form a vortex in the vortex chamber at the time of the large flow injection by fine-tuning the values of the angle θ between the large flow pipe 2 and the small flow pipe 3 and the flows (the flow rates) of the large flow pipe 2 and the small flow pipe 3, it is necessary to rebuild the entire flow damper many times in order to adjust these values. Such an attempt may bring about numerous prototype flow dampers that would involve huge labors and fabrication costs.

SUMMARY OF THE INVENTION

In view of the aforementioned circumstances, it is an object of the present invention to provide an accumulator including a flow damper which is capable of suppressing formation of a vortex in a vortex chamber at the time of a large flow injection without requiring huge labors and fabrication costs.

To attain the object, an accumulator according to a first aspect of the present invention is an accumulator provided with a flow damper inside, the flow damper including a cylindrical vortex chamber, a small flow pipe connected to a peripheral portion of the vortex chamber along a tangential direction thereto, a large flow pipe connected to the peripheral portion while forming a predetermined angle with the small flow pipe, and an outlet pipe connected to an outlet formed at a central part of the vortex chamber. Here, the accumulator is characterized in that the flow damper includes a colliding jet controller for controlling a colliding jet composed of a jet from the large flow pipe and a jet from the small flow pipe flowing into the vortex chamber at the time of a large flow injection so that the colliding jet may proceed directly to the outlet without forming a vortex in the vortex chamber, the colliding jet controller being provided at a junction of the small flow pipe and the vortex chamber.

Moreover, an accumulator according to a second aspect of the present invention, in the case of the accumulator of the first aspect, is characterized in that the colliding jet controller is a bevel formed at the junction of the small flow pipe and the vortex chamber.

Furthermore, an accumulator according to a third aspect of the present invention, in the case of the accumulator of the first aspect, is characterized in that the colliding jet controller is a projection formed at the junction of the small flow pipe and the vortex chamber.

The accumulator of the first aspect of the present invention is characterized in that the flow damper includes a colliding jet controller for controlling a colliding jet composed of a jet from the large flow pipe and a jet from the small flow pipe flowing into the vortex chamber at the time of a large flow injection so that the colliding jet may proceed directly to the outlet without forming a vortex in the vortex chamber, the colliding jet controller being provided at a junction of the small flow pipe and the vortex chamber. Accordingly, it is possible to cause the jet from the large flow pipe and the jet from the small flow pipe to offset the mutual angular momenta easily and securely so as not to generate a vortex in the vortex chamber at the rime of a large flow only by adjusting a control amount of the colliding jet by use of the colliding jet controller (i.e. only by rebuilding the colliding jet controller) instead of rebuilding the entire flow damper. Hence is it possible to drastically reduce labors and fabrication costs for adjusting the colliding jet.

In particular, according to the accumulator of the second or the third aspect of the present invention, either the bevel or the projection is formed as the colliding jet controller, and the colliding jet is controlled by use of the bevel or the projection. Hence, it is possible to obtain a significant effect as similar to the first aspect merely by an extremely simple adjustment work for adjusting either the size of the bevel or a projecting amount of the projection.

BRIEF DESCRIPTION OF THE DRAWINGS

The present invention will become more fully understood from the detailed description given hereinbelow and the accompanying drawings which are given by way of illustration only, and thus are not limitative of the present invention and wherein;

FIGS. 11A and 11B are cross-sectional views taken along the H-H arrow line in FIG. 2, showing the configuration of curved bevels.

DESCRIPTION OF THE PREFERRED EMBODIMENT

Hereinafter, a preferred embodiment of the present invention will be described below in detail with reference to the accompanying drawings.

(Configuration)

Figure 1:
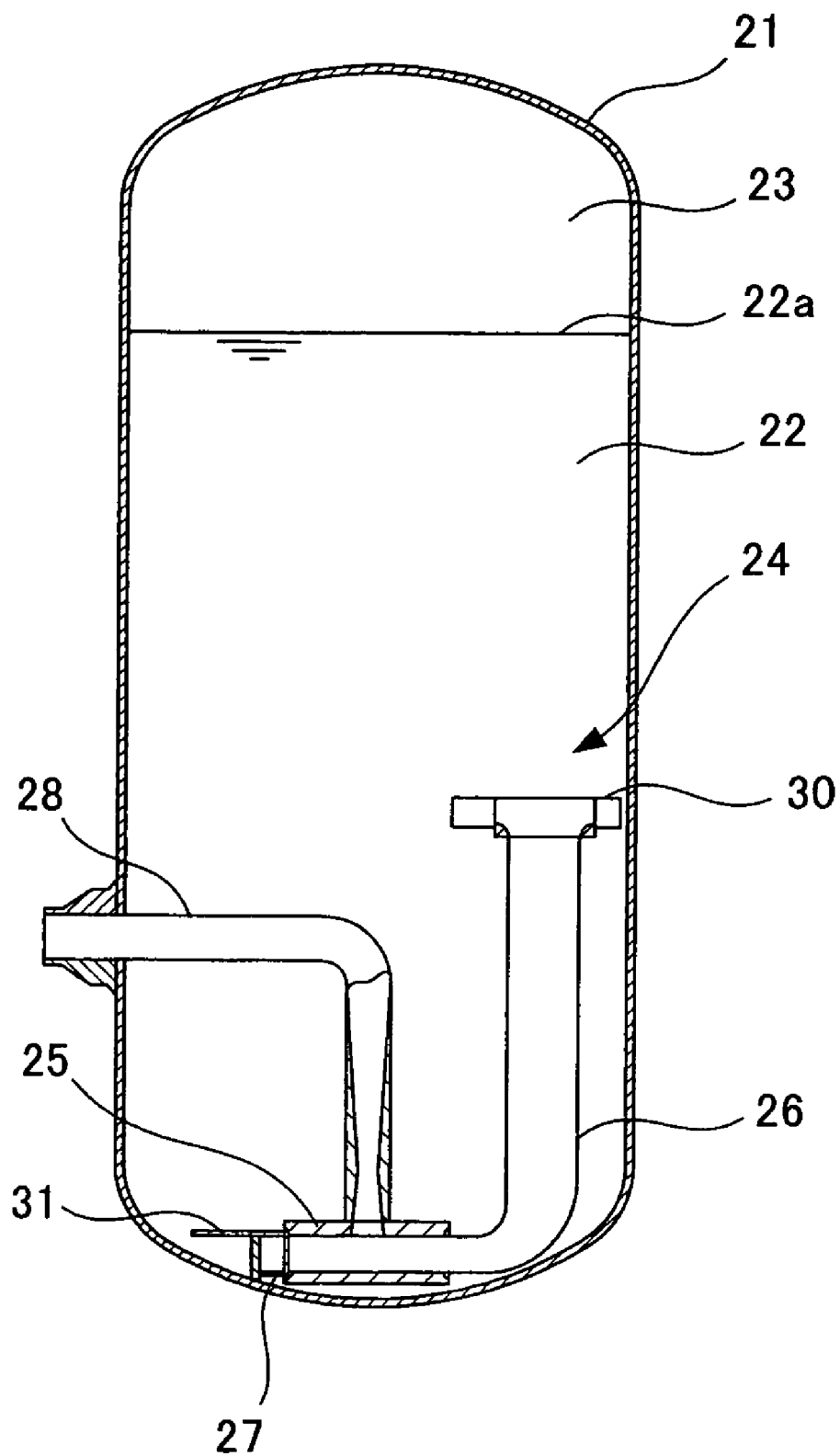
FIG. 1 is a cross-sectional view of an accumulator according to an embodiment of the present invention.
Figure 2:
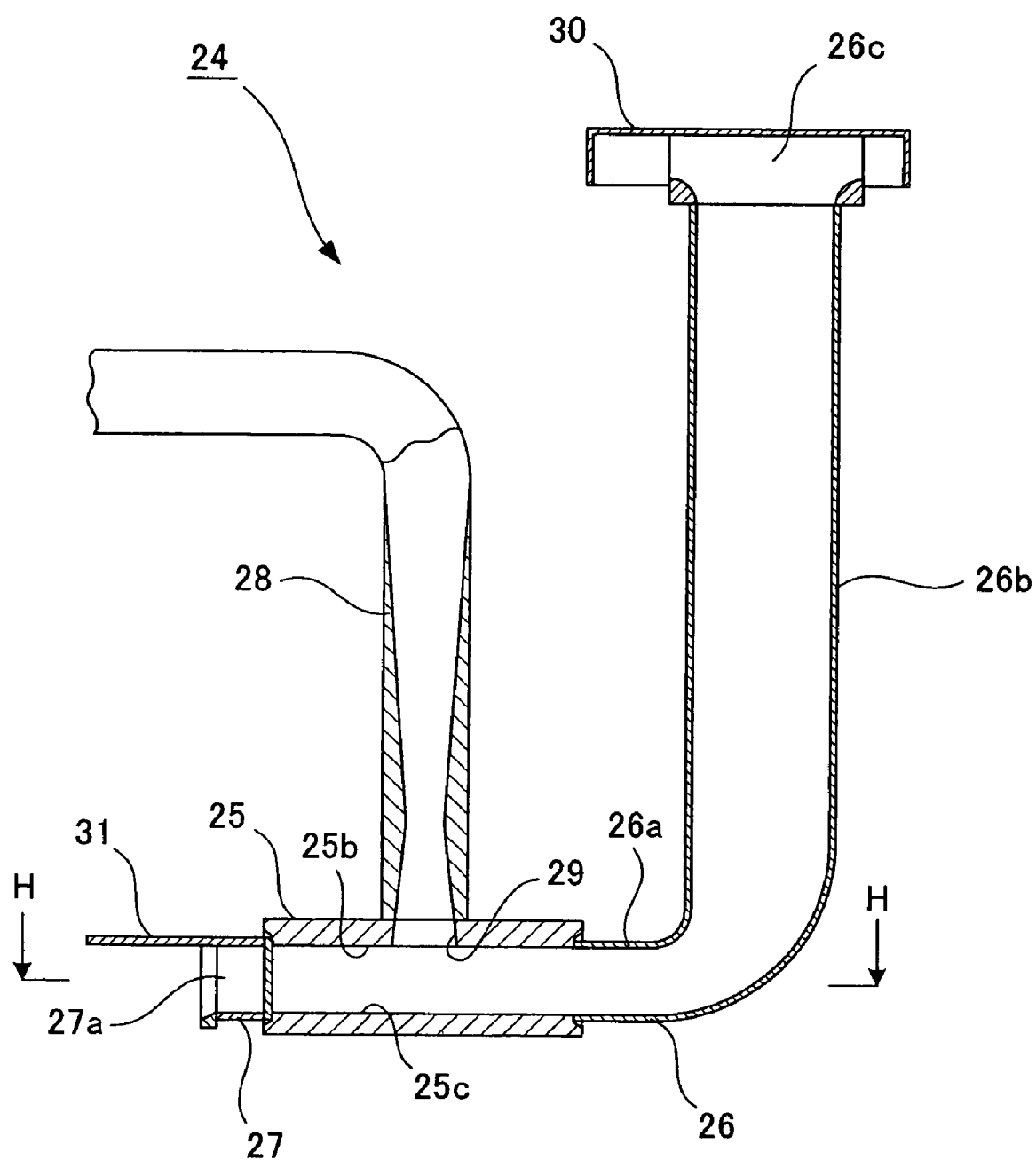
FIG. 2 is an enlarged cross-sectional view extracting and showing a flow damper included in the accumulator.

An accumulator 21 shown in FIG. 1 is an apparatus constituting part of an emergency core cooling system, which is installed in a pressurized water reactor (PWR) power plant on the assumption that a loss of primary coolant accident might occur in the PWR power plant.

As shown in FIG. 1, water (a coolant) 22 is stored in the accumulator 21, and the water 22 stored therein is pressurized by a pressurizing gas (nitrogen gas) 23 which is filled in an upper part in the accumulator 21. Moreover, a flow damper 24, which can switch a water injection flow rate in a reactor from a large flow to a small flow statically, is provided in the accumulator 21.

The flow damper 24 includes a vortex chamber 25, a large flow pipe 26, a small flow pipe 27, an outlet pipe 28 and the like, and is disposed at the bottom in the accumulator 21. Although illustration is omitted, a tip end of the outlet pipe 28 is connected to a low temperature pipeline of a reactor primary coolant loop with a check valve interposed in between. The check valve is used for avoiding a back flow from a rector primary cooling system to the accumulator 21.

As shown in FIG. 1 to FIG. 5B, the flow damper 24 has a structure in which the large flow pipe 26 and the small flow pipe 27 are connected to a peripheral portion (a circumferential portion) of the cylindrical vortex chamber 25, while an outlet 29 is formed in the center of an upper surface 25b of the vortex chamber 25. Alternatively, the outlet 29 may be provided in the center of a lower surface 25c of the vortex chamber 25.

Figure 3:
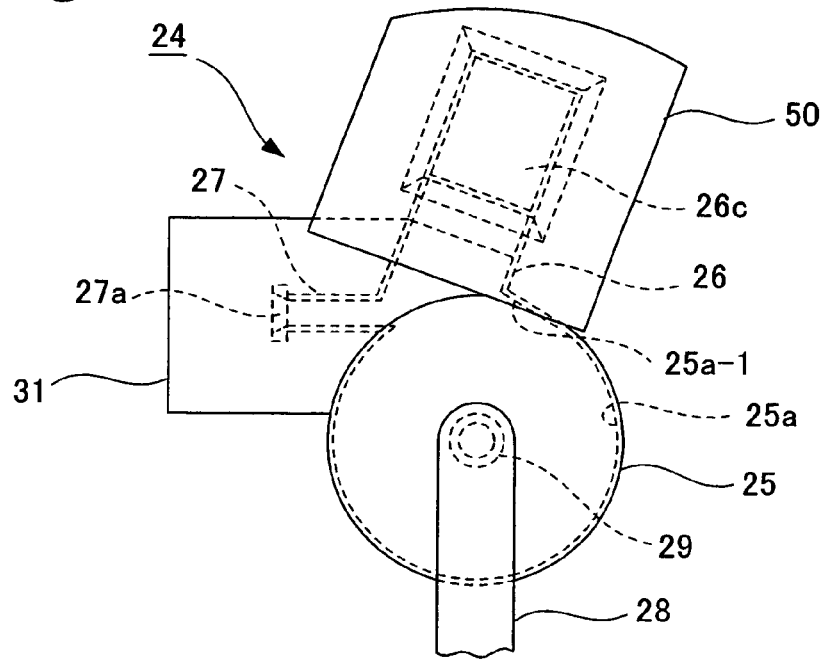
FIG. 3 is a plan view of the flow damper.
Figure 4:
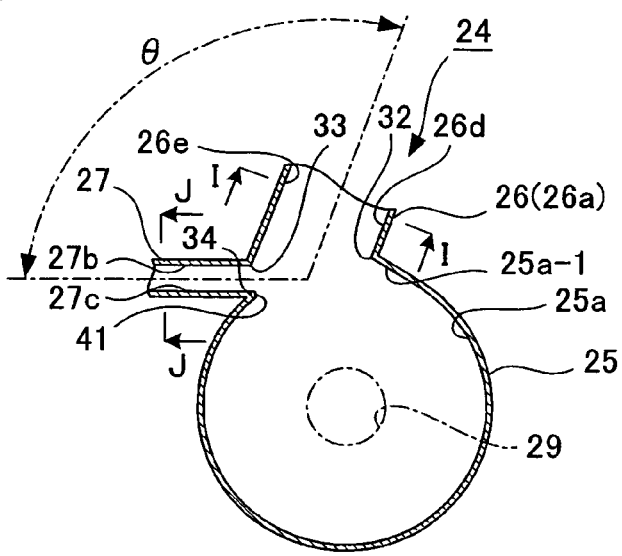
FIG. 4 is a cross-sectional view taken along, and indicated by, the H-H arrow line in FIG. 2.

In view of horizontal surfaces as illustrated in FIG. 3 and FIG. 4, the large flow pipe 26 and the small flow pipe 27 extend in mutually different directions from the outlet 29. Specifically, the small flow pipe 27 extends in a direction (which is the left direction in the drawings) along a tangential direction to the peripheral portion (the circumferential portion) of the vortex chamber 25. Meanwhile, the large flow pipe 26 extends in another direction (which is the right direction in the drawings) while forming a predetermined angle θ (in a range from 90°<θ<180°; such as 95°, 100° or 110°) with the small flow pipe 27.

Figures 5A, 5B:
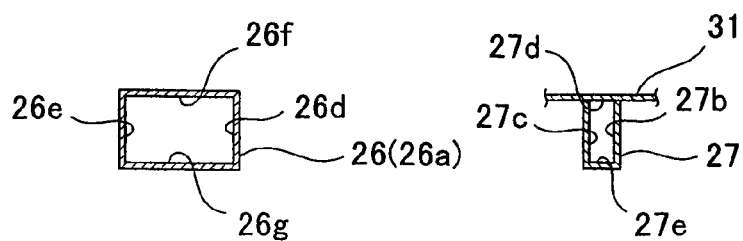
FIG. 5A is a cross-sectional view taken along, and indicated by, the I-I line in FIG. 4.
FIG. 5B is a cross-sectional view taken along, and indicated by, the J-J line in FIG. 4.

Cross sections of flow passages of the large flow pipe 26 and the small flow pipe 27 are formed into rectangular shapes. Specifically, as shown in FIGS. 5A and 5b, for example, the large flow pipe 26 (a horizontal portion 26a) has a parallel pair of inner surfaces (vertical surfaces) 26d and 26e which face each other in the horizontal direction, and a parallel pair of inner surfaces (horizontal surfaces) 26f and 26g which face each other in the vertical direction. Meanwhile, the small flow pipe 27 has a parallel pair of inner surfaces (vertical surfaces) 27b and 27e which face each other in the horizontal direction, and a parallel pair of inner surfaces (horizontal surfaces) 27d and 27e which face each other in the vertical direction. The heights of the flow-passage cross sections of the large flow pipe 26 and the small flow pipe 27 (the heights of the inner surfaces 26d and 26e and of the inner surfaces 27b and 27c) are the same as the height of an inner peripheral surface 25a of the vortex chamber 25. On the other hand, the widths of the flow-passage cross sections of the large flow pipe 26 (the widths of the inner surfaces 26f and 26g) are greater than the widths of the flow-passage cross sections of the small flow pipe 27 (the widths of the inner surfaces 27d and 27e).

Moreover, an inlet 27a of the small flow pipe 27 is located at the same height as that of the inner peripheral surface 25a of the vortex chamber 25. On the other hand, the large flow pipe 26 includes a standpipe 26b connected to the horizontal portion 26a, and an inlet 26c thereof is located higher than the vortex chamber 25 and the inlet 27a of the small flow pipe 27. It is to be noted, however, that a water level 22a of the stored water 22 is usually located higher than this inlet 26c of the large flow pipe 26. The outlet pipe 28 is connected to the outlet 29 of the vortex chamber 25. Anti-vortex plates 30 and 31 are respectively provided to the inlets 26c and 27a of the large flow pipe 26 and the small flow pipe 27.

Figure 6:
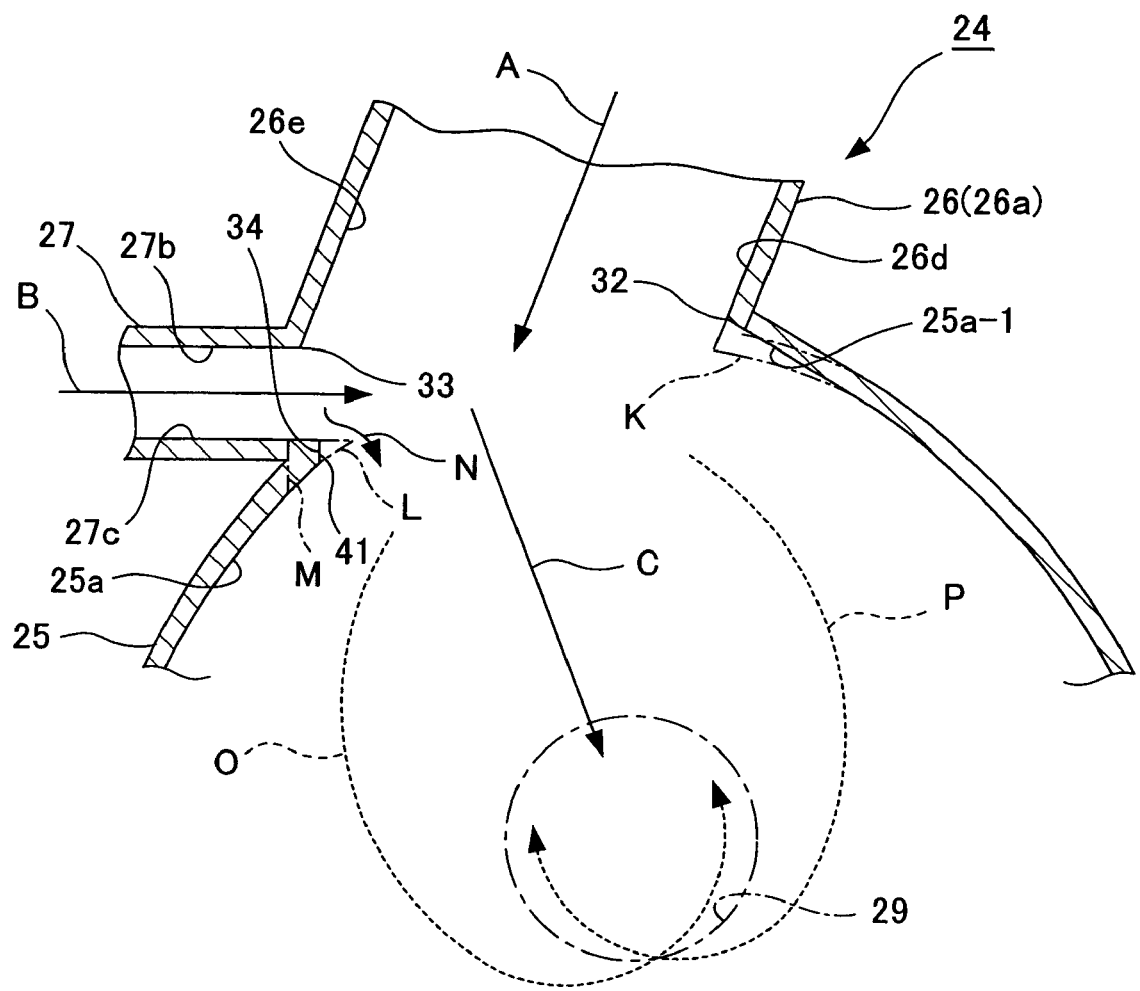
FIG. 6 is an enlarged cross-sectional view of a substantial part in FIG. 4.

As shown in FIG. 4 and FIG. 6, the inner surface 27b, at the side of the large flow pipe 26, of the small flow pipe 27 is connected to the inner surface 26e, at the side of the small flow pipe 27, of the large flow pipe 26. Moreover, in consideration of a spread of a jet from the small flow pipe 27 (a free-jet-spread proportion), a junction 32 of the inner surface 26d, at the opposite side of the small flow pipe 27, of the large flow pipe 26 and an extended surface portion (a flat surface portion) 25a-1 of the inner peripheral surface 25a of the vortex chamber 25 is located outside an extension line of the inner surface 27b, at the side of the large flow pipe 26, of the small flow pipe 27 (the line extending from the junction 33 in the tangential direction). It is to be noted, however, that the present invention is not limited to the foregoing configuration. It is also serves the purpose to adopt a structure in which the junction of the inner surface 26d and the inner peripheral surface 25a does not include the extended surface portion (the flat surface portion) 25a-1 as indicated with a dashed line K in the drawing.

Moreover, the inner surface 27c, at the opposite side of the large flow pipe 26, of the small flow pipe 27 is connected to the inner peripheral surface 25a of the vortex chamber 25 at a junction 34. This junction 34 is located upstream of the junction 33 in terms of the direction of the flow (the direction of the jet: see an arrow B) from the small flow pipe 27.

Moreover, in this embodiment, as shown in FIG. 4 and FIG. 6, the flow damper 24 includes a bevel 41 functioning as a colliding jet controller which is provided at the junction 34 of the small flow pipe 27 (the inner surface 27c) and the vortex chamber 25 (the inner peripheral surface 25a). Specifically, by forming the bevel 41 in an appropriate size at the junction 34, it is possible to control a colliding jet composed of a jet from the large flow pipe 26 and a jet from the small flow pipe 27 flowing into the vortex chamber 25 at the time of a large flow injection so that the colliding jet may proceed directly to the outlet 29 securely without forming a vortex in the vortex chamber 25.

For example, a decrease in the size of the bevel 41 as indicated with a dashed line L in FIG. 6 causes an increase in the amount of the jet from the large flow pipe 26, which flows along the direction of the jet from the small flow pipe 27 while bypassing the bevel 41 as indicated with an arrow N. As a result, the colliding jet composed of the jet from the large flow pipe 26 and the jet from the small flow pipe 27 tends to form a clockwise vortex as indicated with an arrow P. On the other hand, an increase in the size of the bevel 41 as indicated with a dashed line M in FIG. 6 causes a decrease in the amount of the jet from the large flow pipe 26, which flows along the direction of the jet from the small flow pipe 27 while bypassing the bevel 41. As a result, the colliding jet composed of the jet from the large flow pipe 26 and the jet from the small flow pipe 27 tends to form a counterclockwise vortex as indicated with an arrow O.

In other words, it is possible to control the colliding jet by the size of the bevel 41. Accordingly, it is possible to cause the colliding jet to proceed directly toward the outlet 29 as indicated with an arrow C by adjusting the bevel 41 into an appropriate size.

Incidentally, the bevel formed at the junction 34 is not limited to the bevel 41 which is cut away in an orthogonal direction to the direction of the jet from the small flow pipe 27 (the tangential direction). For example, the bevel may be formed in an oblique direction relative to the direction of the jet from the small flow pipe 27. Moreover, the bevel may be a bent bevel or a curved bevel.

Figure 7:
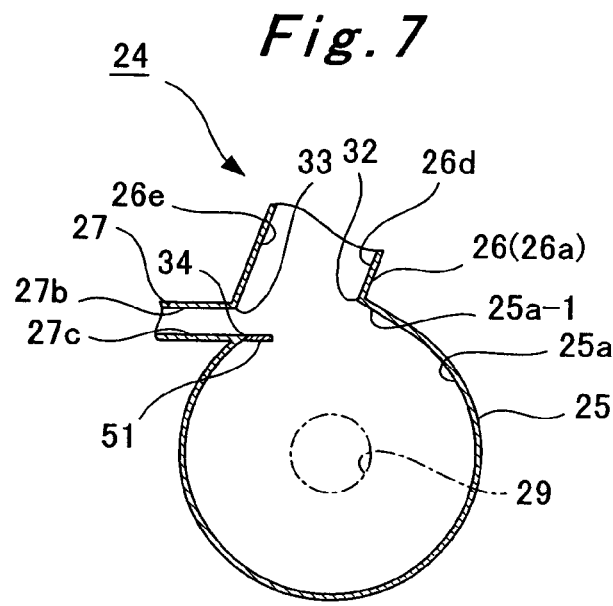
FIG. 7 is a cross-sectional view (a cross-sectional view corresponding to FIG. 4) showing another configuration example of the colliding jet controller.
Figure 8:
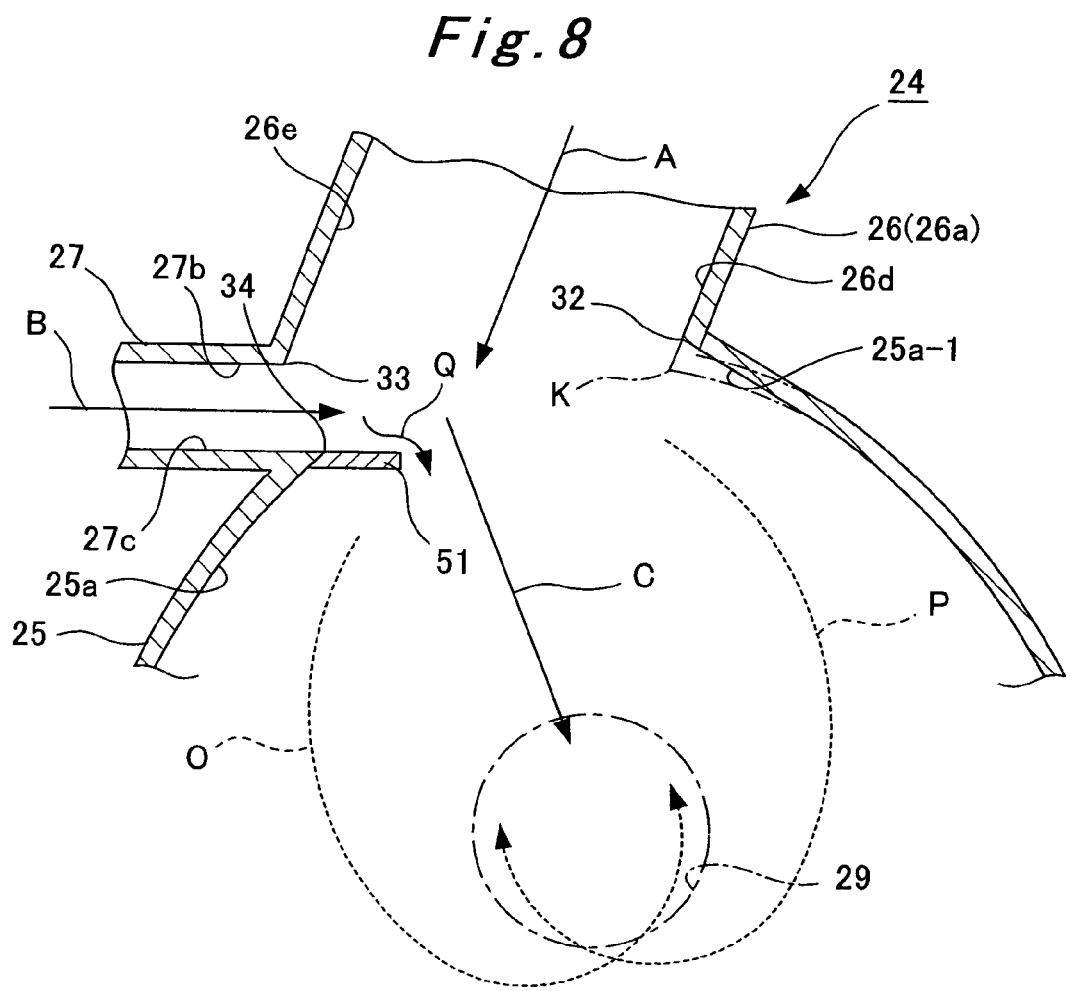
FIG. 8 is an enlarged cross-sectional view (a cross-sectional view corresponding to FIG. 6) of a substantial part of the colliding jet controller illustrated in FIG. 7.

Furthermore, the flow damper 24 shown in FIG. 7 and FIG. 8 includes a projection 51 functioning as the colliding jet controller which is provided at the junction 34 of the small flow pipe 27 (the inner surface 27c) and the vortex chamber 25 (the inner peripheral surface 25a). The projection 51 in the illustrated example has a plate shape. By forming the projection 51 in an appropriate projecting amount at the junction 34, it is possible to control the colliding jet composed of the jet from the large flow pipe 26 and the jet from the small flow pipe 27 flowing into the vortex chamber 25 at the time of a large flow injection so that the colliding jet may proceed directly to the outlet 29 securely without forming a vortex in the vortex chamber 25.

For example, an increase in the projecting amount of the projection 51 causes an increase in the amount of the jet from the large flow pipe 26, which flows along the direction of the jet from the small flow pipe 27 while bypassing the projection 51 as indicated with an arrow Q. As a result, the colliding jet composed of the jet from the large flow pipe 26 and the jet from the small flow pipe 27 tends to form a clockwise vortex as indicated with the arrow P. On the other hand, a decrease in the projecting amount of the projection 51 causes a decrease in the amount of the jet from the large flow pipe 26, which flows along the direction of the jet from the small flow pipe 27 while bypassing the projection 51. As a result, the colliding jet composed of the jet from the large flow pipe 26 and the jet from the small flow pipe 27 tends to form a counterclockwise vortex as indicated with the arrow O.

In other words, it is possible to control the colliding jet by the projecting amount of the projection 51. Accordingly, it is possible to cause the colliding jet to proceed directly toward the outlet 29 as indicated with the arrow C by adjusting the projecting amount of the projection 51 into an appropriate size.

Incidentally, the projection formed at the junction 34 is not limited to the projection 51 which is projected straight in the direction of the jet from the small flow pipe 27 (the tangential direction). For example, the projection may be formed into a plate in an oblique direction relative to the direction of the jet. Moreover, the projection may be a bent projection or a curved projection. Furthermore, the projection may be formed into a shape other than the plate shape (one having a triangular horizontal cross section is also applicable, for example).

(Operation and effects)

The accumulator 21 having the above-described configuration exerts the following operation and effects.

If a pipeline or the like in a reactor primary cooling system of a PWR power plant is broken, and the coolant flows out of a crack to the outside (i.e. upon occurrence of a loss of primary coolant accident), thereby reducing a pressure of the primary cooling system below a pressure in the accumulator 21, the stored water 22 in the accumulator 21 is injected from the primary cooling system pipeline into a reactor vessel through a check valve, and thereby refloods a reactor core. At this time, the water injection flow rate to the reactor vessel is switched from a large flow to a small flow statically by way of the flow damper 24.

Figure 9A:
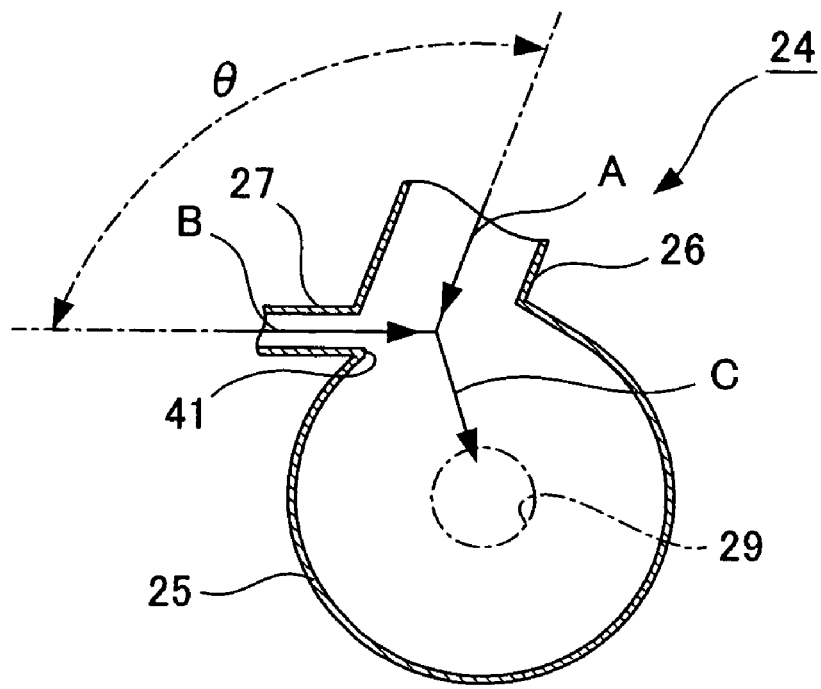
FIGS. 9A and 9B are views for explaining water injection flow switching by use of the flow damper.

Specifically, since the water level in the accumulator 21 is higher than the inlet 26c of the large flow pipe 26 at an initial stage of water injection, the water 22 in the accumulator 21 flows into the vortex chamber 25 from both of the large flow pipe 26 and the small flow pipe 27 as indicated with arrows A and B in FIG. 9A. As a result, the injected water (a jet) from the large flow pipe 26 collides with the injected water (a jet) from the small flow pipe 27, and angular momenta of the jets are offset. In this way, the water 22 flows directly toward the outlet 29 as indicated with an arrow C in FIG. 9A. Specifically, no vortex is formed in the vortex chamber 25 at this time. Accordingly, a flow resistance is reduced at this time, and a large amount of water flows out of the outlet 29 and is injected into the reactor vessel.

Figure 9B:
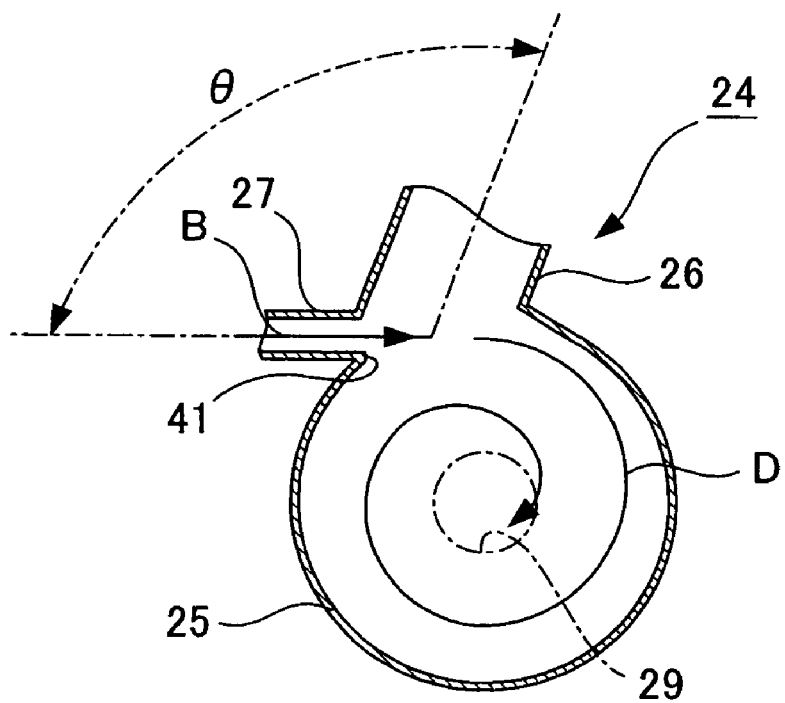
Figure 10A:
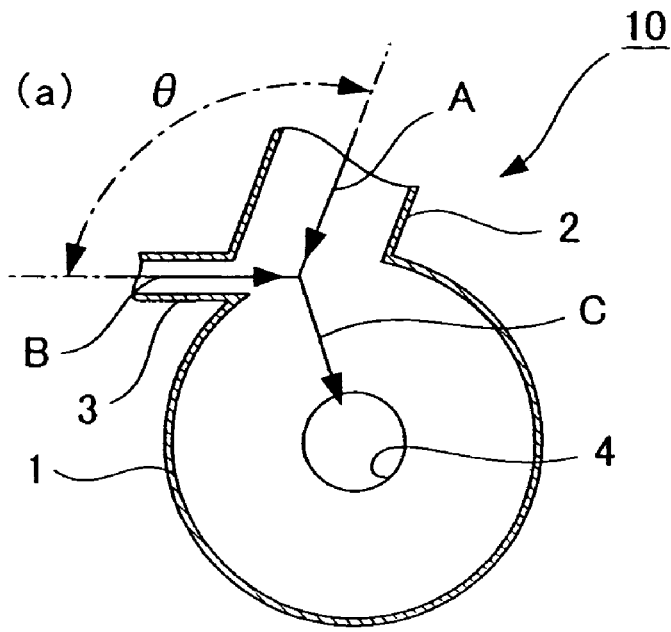
FIGS. 10A to 10B are views for explaining water injection flow switching by use of a conventional flow damper.
Figure 10B:
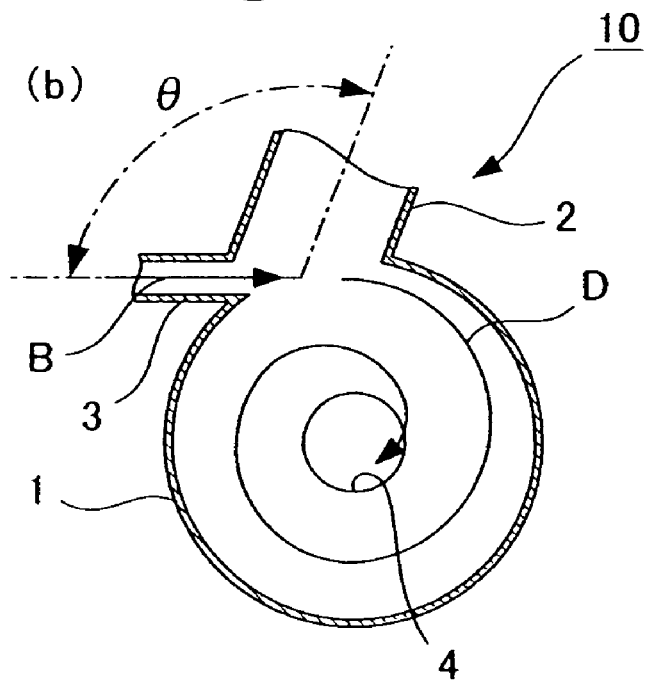

By contrast, at a later stage of water injection, the water level in the accumulator 21 drops below the inlet 26c of the standpipe connected to the large flow pipe 26. Accordingly, there is no water 22 flowing from the large flow pipe 26 into the vortex chamber 25, and the water 22 flows into the vortex chamber 25 only through the small flow pipe 27 as indicated with an arrow B in FIG. 9B. As a result, the injected water from this small flow pipe 27 proceeds to the outlet 29 while forming a vortex (a swirling flow) as indicated with an arrow D in FIG. 7B. Accordingly, the flow resistance is increased by the centrifugal force at this time, and an outflow (the water injected to the reactor vessel) from the outlet 29 becomes a small flow. Although FIG. 9 illustrates the example of providing the bevel 41, similar water injection flow rate switching is achieved in the case of providing the projection 51 as well.

Moreover, according to the accumulator 21 of this embodiment, the flow damper 24 includes the colliding jet controller (the bevel 41 or the projection 51), which is configured to control the colliding jet composed of the jet from the large flow pipe 26 and the jet from the small flow pipe 27 flowing into the vortex chamber 25 at the time of a large flow injection so that the colliding jet may proceed directly to the outlet 29 without forming a vortex in the vortex chamber 25, the colliding jet controller being provided at the junction 34 of the small flow pipe 27 and the vortex chamber 25. Accordingly, it is possible to cause the jet from the large flow pipe 26 and the jet from the small flow pipe 27 to offset the mutual angular momenta easily and securely so as not to generate a vortex in the vortex chamber 25 at the rime of a large flow, only by adjusting a control amount of the colliding jet by use of the colliding jet controller (i.e., only by rebuilding the colliding jet controller in the vortex chamber 25) instead of rebuilding the entire flow damper 24. Hence is it possible to drastically reduce labors and fabrication costs for adjusting the colliding jet.

In particular, according to the flow damper 24 of this accumulator 21, either the bevel 41 or the projection 51 is formed as the colliding jet controller, and the colliding jet is controlled by use of the bevel 41 or the projection 51. Hence, it is possible to obtain a significant effect as described above merely by an extremely simple adjustment work for adjusting either the size of the bevel 41 or the projecting amount of the projection 51. Incidentally, application of the bevel or the projection for controlling the colliding jet may be selected as appropriate depending on the angle θ between the large flow pipe 26 and the small flow pipe 27 or on the proportion of the flows (the flow rates) between the large flow pipe 26 and the small flow pipe 27 (i.e. a balance in the angular momenta between the jet from the large flow pipe 26 and the jet from the small flow pipe 27), for example.

The invention thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An accumulator provided with a flow damper inside, the flow damper including a cylindrical vortex chamber, a small flow pipe connected to a peripheral portion of the vortex chamber along a tangential direction thereto, a large flow pipe connected to the peripheral portion while forming a predetermined angle with this small flow pipe, and an outlet pipe connected to an outlet formed at a central part of the vortex chamber, wherein the flow damper comprises a colliding jet controller for controlling a colliding jet composed of a jet from the large flow pipe and a jet from the small flow pipe flowing into the vortex chamber at the time of a large flow injection so that the colliding jet may proceed directly to the outlet without forming a vortex in the vortex chamber, the colliding jet controller is a bevel formed at a junction of the small flow pipe and the vortex chamber, and said bevel is formed in a predetermined shape having a predetermined surface, in which said predetermined surface extends from an inner surface, which is located at the opposite side of the large flow pipe, of the small flow pipe to an inner peripheral surface of the vortex chamber.

2. The accumulator according to claim 1, wherein the bevel formed at the junction being in an oblique direction relative to the direction of the jet from the small flow pipe.

3. The accumulator according to claim 1, wherein the bevel formed at the junction being bent.

* * * * *